United States Patent [19]
Collet

[11] Patent Number: 5,758,159
[45] Date of Patent: May 26, 1998

[54] STRUCTURED SOFTWARE FOR A TELECOMMUNICATION SYSTEM, INCLUDING A COMMUNICATION SERVICE OBJECT WHICH USES RELATIONSHIP DATA TO ROUTE A MESSAGE FROM AN ORIGINATOR OBJECT TO A RECIPIENT OBJECT

[75] Inventor: Edouard Collet, Perros Guirec, France

[73] Assignee: Alcatel N.V., Amsterdam, Netherlands

[21] Appl. No.: 913,871

[22] Filed: Jul. 15, 1992

[30] Foreign Application Priority Data

Jul. 16, 1991 [FR] France ............... 91 08982

[51] Int. Cl.$^6$ ............... G06F 15/163
[52] U.S. Cl. ............... 395/683; 395/680; 395/684; 395/712
[58] Field of Search ............... 395/800, 700, 395/820, 712, 680, 683, 684

[56] References Cited

U.S. PATENT DOCUMENTS

| 5,303,379 | 4/1994 | Khoyi et al. | 395/710 |
| 5,339,392 | 8/1994 | Risberg et al. | 345/333 |
| 5,367,681 | 11/1994 | Foss et al. | 395/683 |

FOREIGN PATENT DOCUMENTS 0 405 829  6/1990  European Pat. Off.

OTHER PUBLICATIONS

K.W. Plessmann et al. "Concurrent Object–Oriented Program Design in Real–Time Systems", Microprocessing and Microprogramming, vol. 24, No. 1–5, 1988, Amsterdam, NL, pp. 257–265.

H. Lorin, "An Expanded Approach to Objects", ACM/operating systems review, vol. 20, No. 1, Jan. 1986, New York, pp. 6–11.

*Primary Examiner*—Alyssa H. Bowler
*Assistant Examiner*—John Follansbee
*Attorney, Agent, or Firm*—Fulbright & Jaworski L.L.P.

[57] ABSTRACT

A software structure comprises structural objects each comprising at least one service access point to which a message addressed to the object may be sent. Each structural object is associated with other objects by relationships which relate it structurally relative to the other objects. Communication between objects takes place by transmission of messages between a service access point module of an originator object and a service access point module of a recipient object via a communication service object receiving messages to be sent from the originator objects and supplying them to the recipient objects. The communication service contains data defining the relationships between objects and refers thereto at the same time as to the recipient object identity in the header of a message in determining the identity of the structural object to which the message must be sent.

5 Claims, 5 Drawing Sheets

STRUCTURED SOFTWARE FOR A TELECOMMUNICATION SYSTEM, INCLUDING A COMMUNICATION SERVICE OBJECT WHICH USES RELATIONSHIP DATA TO ROUTE A MESSAGE FROM AN ORIGINATOR OBJECT TO A RECIPIENT OBJECT

BACKGROUND OF THE INVENTION

1. Field of the Invention

The present invention concerns a data processing system software structure, in particular for a telecommunication system.

2. Description of the Prior Art

Telecommunication systems and data processing systems in general use computer technology. The software run on the computers is usually structured in functional blocks operating on external data. Typical systems of this kind are the COMITE CONSULTATIF INTERNATIONAL TELEGRAPHIQUE ET TELEPHONIQUE (International Consultative Committee for Telegraphy and Telephony) Specification and Description Language system and the INTERNATIONAL STANDARDS ORGANIZATION ESTELLE (ISO 1974) system. Each functional block implements one function but may use another block to implement part of the function, which other block may need to use a further block, and so on. The functional blocks communicate with each other using messages.

Although the structure of these known systems represents a good match to functional analysis methods, it is open to criticism in that it leads to a multiplicity of types of functional block and a corresponding complexity in communication between blocks.

It is known to structure software in terms of "objects", each object combining data and procedures using the data. Again, messages are used for communication between objects. Reference may usefully be had to the article "Les approches objets et le langage LRO2 (KEOPS)" ("The object-oriented approach and the LRO2 (KEOPS) language") by C. ROCHE et al published in "Technique et Science Informatique", vol. 8, No 1, 1989. This article explains in particular how objects are easily created as instances of pre-existing classes which are already objects. The classes are in turn organized structurally by relationships which enable new classes to be created from existing classes. Two particular relationships mentioned in the article are the inheritance relationship in which an instance which "inherits" receives a copy of the data and the procedures of the class in which it is registered and the hierarchy relationship in which a class is the means of access to another class of lower rank in the hierarchy.

Object-oriented structures are widely accepted to have significant advantages in respect of the design, debugging and maintenance of large programs.

However, conventional-object oriented structures do not allow for the multiple interactions that are a feature of telecommunication systems.

What is more, the object-oriented structure as described in the aforementioned publication still has the drawbacks of a multiplicity of functional block types and great complexity of communication between blocks.

An object of the present invention is therefore a data processing system software structure, in particular for telecommunication systems, which meets "real time" type requirements whilst exploiting the advantages of "object-oriented" structures but significantly reducing the drawbacks previously referred to.

SUMMARY OF THE INVENTION

The present invention consists a data processing system software structure, for example for a telecommunication system, comprising structural objects each including data and procedures which are programs using the data of the object such that the object is presented as a "service provider" in the sense of CCITT Recommendation X.200 and each comprising at least one service access point to which a message addressed to the object may be sent by a "service user" in the sense of CCITT Recommendation X.200, any such message including a header and parameters, said header including an object identity, each structural object being associated with other objects by relationships which relate it to said other objects structurally, in which structure each object is made up of one or more service access point modules and one or more kernel modules and communication between objects takes place by transmission of messages between a service access point module of an originator object and a service access point module of a recipient object, in accordance with a communication protocol, said messages being transmitted by a communication service object receiving the messages to be routed from the originator objects and supplying them to the recipient objects, said communication service including data defining the relationships between objects and referring thereto at the same time as to the object identity of the header of a message to determine the identity of the recipient structural object to which the message must be sent.

The introduction of modular structure objects increases their complexity but reduces their number, without rendering design more costly. Message-based communication, essentially asynchronous and consequently requiring costly precautions to preserve the "real time" aspect of processing, can therefore be limited to communication between fewer objects. Moreover, structuring the software by means relationships between objects which are taken into account by said communication service enables messages to be routed without the objects needing to know the structure into which they are inserted, whilst allowing highly sophisticated structuring which also reduces the number of objects and so facilitates the solving of real time problems.

In a software structure in accordance with the invention said communication protocol is defined in the service access point module of the recipient object and is specified by the latter to the service access point module of the originator object in order that the latter apply it.

With this arrangement the originator object does not need to know the nature of the recipient structural object. This facilitates designing these objects.

Said message header preferably contains the identity of an operation requested of the message recipient object and said communication service allows for said requested operation identity in selecting the service access point of a recipient structural object to which a message is to be sent.

Said relationships preferably include dependency, use, inclusion and homology.

The various objects and features of the invention will now be explained in more detail through the following description of one embodiment of the present invention given with reference to the accompanying drawings.

DETAILED DESCRIPTION OF THE INVENTION

Figure 1:
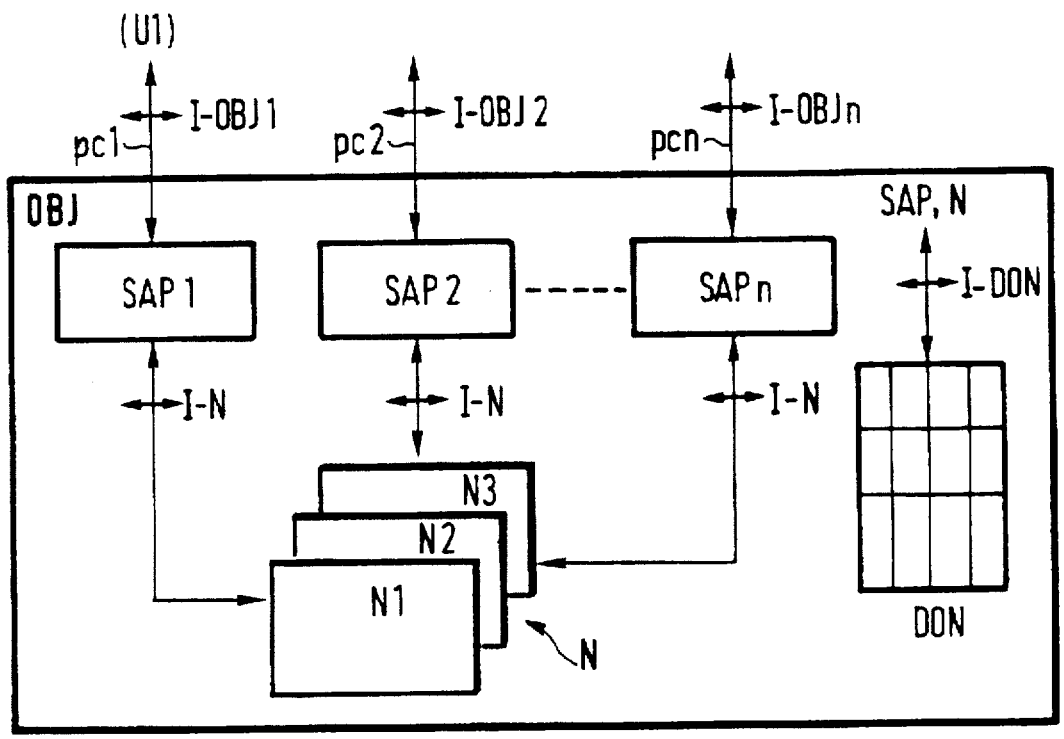
FIG. 1 shows an object with one or more individual service access points included in a software structure in accordance with the invention.

FIG. 1 is a block diagram of a structural object OBJ as defined in the preamble to this application and which therefore comprises data and procedures. The procedures can be organized in any way. They may constitute an algorithm, a data manipulation system, a finite state automaton, etc. A structural object is defined by its attributes, in other words by the structural elements which constitute it, and by the functions which it implements, using the processing routines (programs) that it contains; as will emerge later, it is also characterized by relationships between structural or merely functional objects. A structure based on objects of this kind is advantageous for reasons connected with the validation and re-use of the object software.

A structural object comprises one or more communication ports which constitute "service access points" in the sense of CCITT Recommendation X.200. Each has a service access point module. In this example the object OBJ has three service access points pc1, pc2, pcn with respective service access point modules SAP1, SAP2 SAPn. The service access points of the object OBJ are accessible via respective access interfaces I-OBJ1, IOBJ2, I-OBJn. The interface defines communication between another object seen as a user of the object OBJ and a respective service access point of the object OBJ seen as service provider. The activation of the object OBJ from another object (U1, for example) is therefore achieved by the transmission of a message from the object U1 to one of the service access point modules (SAP1, for example) of the object OBJ using a communication protocol embodied in the respective interface I-OBJ1. A communication protocol may be generally defined at the interface level as the set of rules for constituting and processes for interpreting messages, including the execution of communication actions which are requested by the content of such messages.

The communication protocol is embodied in the service access point of the service provider object receiving a message and any communication begins by identifying the protocol to be used on the basis of information supplied by the service access point module of the recipient object and sent to the originator object which initiated the transmission of the message. The object OBJ therefore has no need to know the object U1 to determine the communication protocol to be used. Likewise, the object you run has no need to know in advance the communication protocol to be used.

The messages supplied to the service access points pc1, pc2, pcn are processed by the service access point modules SAP1, SAP2, SAPn individually responsible for processing an incoming message, analyzing it and carrying out any required action, often to alert the kernel N in order to have the requested procedures carried out. Each of these service access point (SAP for short) modules therefore knows a communication protocol and supplies it at the access interface side.

The various SAP communicate with the kernel N of the object OBJ using messages sent via individual ports which preferably have the same internal interface I-N. This means that communication between the various SAP and the kernel N complies with common communication rules and that the SAP provide any adaptation required between the various access protocols and the kernel. This simplifies the kernel.

The kernel N applies procedures collectively constituting the function(s) devolved on the object OBJ. The kernel N is itself preferably modular; it comprises modules N1, N2, N3, for example each of which is independent of the others and implements a sub-set of the procedures of the object OBJ. The processing carried out in a SAP when a message is received from a user comprises an analysis which may determine that a particular kernel module must be activated. The analysis differs depending on the SAP concerned so that the function implemented by the object OBJ depends on the SAP by which it was activated.

To give a simple example, SAP1 can be used to execute the normal function of the object OBJ, SAP2 to execute maintenance operations and SAPn to carry out traffic observation. The procedures obviously differ according to which of these SAP invokes the object OBJ.

Although this is not shown in FIG. 1, the modular structure of the kernel N includes the case where executing a function requires action by more than one kernel module, each kernel module invoked possibly invoking another kernel module. Kernel modules communicate via an interface I-N in exactly the same way as SAP communicate with kernel modules and this enables the various kernel modules to act in succession.

The object OBJ further comprises a data module DON. The data in this module conventionally comprises temporary working data some of which is received from other objects and which will be discarded on completing a function, semi-permanent internal data descriptive of the object written by means which are outside the scope of the present invention and which is not modified during processing, and sets of operating data each representing a different call processing operation or, more generally, a different transaction carried out by the object OBJ and known as "contexts", a context being specific to each transaction and retained throughout the time taken to process the transaction. The data module is accessible via the SAP and via the kernel by way of an interface I-DON which is the same for all users of the data module DON. This enables the writing into the data module of data input from other objects, modification of the semi-permanent data at the initiative of the SAP and updating of the context at the initiative of the kernel.

The arrangements in module N1 of the kernel N which enable the latter to implement a requested function, according to the internal message sent to it, will not be described further. Suffice to say in this respect that the module N1 is associated, for example, with a context of the data module DON designated by an indicator included in the message and processes an event which is also indicated in the message, for example in the manner of a finite state automaton.

The messages received from or sent to other objects by the SAP have the following formats:

<message>=<header> <parameters>, in which

<header>=<object> <SAP> <operation> <request type>.

The <object> field designates an object and the characteristics of that object can be deduced from it. If the message is put together by the originator object, the <object> field may designate an object referred to hereinafter as a "functional" object for which there is no corresponding structural object. The same message, when sent to a recipient object, contains in the <object> field the identity of the recipient structural object. These various aspects will be further discussed later. The <object> field may be expressed as a mnemonic using several letters which, when coded, comprises 12 bits, for example.

The <SAP> field indicates which of the SAP that the object comprises is concerned. This may be a mnemonic coded on four bits.

The <operation> field denotes one of the operations provided in the system. The operations requested of the various objects are defined collectively as a set of operations and each object carries out a sub-set of operations included in this set. The overall number of operations is very small. It may be expressed as three letters coded on eight bits.

The <request type> field denotes the type of transaction undertaken or, more specifically, the phase of communication relating to the denoted operation comprising a plurality of possible phases. There are only a few separate transactions. They are individually identified by two letters coded on four bits.

This example shows that the message header may be limited to four bytes.

Note that the combination of the <operation> field and the <request type> field identifies an execution phase in the framework of the general function devolved upon the <object> <SAP> combination.

The <parameters> may be considerably more voluminous; this depends on the operation requested and on the request type, which determines among other things the data that must be passed to the object for the purposes of the processing to be carried out. The structure of the <parameters> is defined by the message header and in particular by the value of the <SAP>, <operation> and <request type> fields.

The role of an SAP in receiving a message of this kind is, for example, to verify the <object> and <SAP> fields which must match the identity of the object and of the SAP and the nature of the operation requested by the <operation> field, to decode the <operation> and <request type> fields to identify the kernel module (module N1, for example) which must respond on receiving the message in question, this decoding being specific to each SAP, in other words allowing for its own identity, to prepare an internal message to be sent via the respective internal interface I-N, and to send the <parameters> to the data module DON to which they are sent by the internal interface I-DON so that they are stored in a predefined memory area of the DON module accessible to the modules of the kernel N. The module N1 can then implement its function alone or in cooperation with other kernel modules.

Although the FIG. 1 block diagram is an essentially structural representation of an object, an essentially organic embodiment will now be described with reference to FIG. 2.

Figure 2:
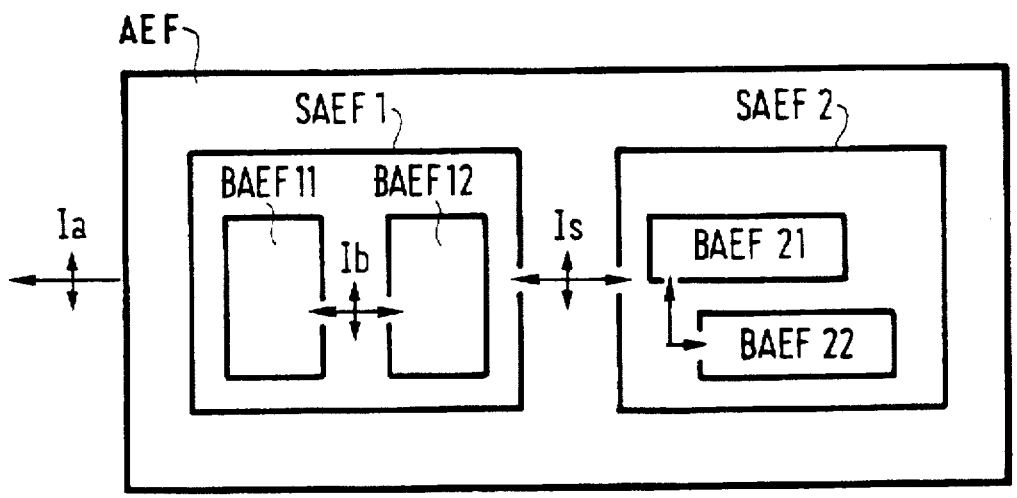
FIG. 2 shows one embodiment of the object from FIG. 1 in the form of a finite state automaton.

FIG. 2 shows a finite state automaton AEF comprising two finite state subautomata SAEF1 and SAEF2. The first subautomaton SAEFI comprises two "automaton bricks" BAEF11 and BAEF12 and the second comprises bricks BAEF21 and BAEF22.

The automaton AEF is accessed via an interface Ia. This interface preferably operates on the first in-first out (FIFO) principle; it is therefore essentially asynchronous. The subautomata SAEF1 and SAEF2 communicate via an interface Is. Although this is not shown in the figure, the automaton AEF and the subautomata communicate via the same interface Is. This interface preferably operates on the "internal queue" principle with the result that operation of the subautomaton cannot be interrupted by any request external to the automaton. An interface of this kind is said to be synchronous. The automaton bricks BAEF11 and BAEF12 communicate via an interface Ib. Although this is not shown in the figure the subautomaton SAEF1 and subautomata that it contains communicate via the same interface Is. The same goes for the subautomaton SAEF2 and the automaton bricks that it contains. The interface Ib may be of the "rendezvous" type which means that the operations of the automaton bricks between themselves and in relation to the subautomaton containing them are interlinked and that the dissociation of a subautomaton into automaton bricks at the design stage is no longer apparent at execution time.

The automata in question at the automaton brick, subautomaton and automaton levels are structures derived from Petri nets familiar to the man skilled in the art.

In practise the object OBJ from FIG. 1 may be of the automaton AEF type from FIG. 2. Each SAP of the object OBJ will take the form of a subautomaton SAEF1, SAEF2, etc which may comprise a plurality of automaton bricks, one brick per operation. The operation of the bricks is strung into a sequence by creating internal events each of which procures the appropriate response from the recipient automaton brick after which the latter returns control to the automaton. This means that there is no problem in synchronizing the automaton bricks. Each kernel module will also take the form of a subautomaton but comprising only one brick, as each executes only one process.

In this way objects communicate exclusively by means of messages, data to be transferred from one object to another being contained in the parameters part of these messages. However, within an object (AEF in FIG. 2), communication is essentially by means of common variables written into the data DON of the object and accessible to the various elements constituting the object.

Likewise, only communication between objects is asynchronous because only messages between objects are put in the FIFO. The result of this is that real time problems, requiring time-delay to monitor situations in which the time allotted to an operation is exceeded, are confined to this level so that the internal logic of the object can be developed without consideration of real time considerations.

One application of a software structure in accordance with the present invention will now be described with reference to FIGS. 3 through 6.

The following description initially omits the "multiprocessing" aspect enabling a structure of this kind to process multiple calls apparently simultaneously and is restricted to the processing of a single call. Similarly, there will be no mention of the "multi-processor" aspect and the reader may assume for the time being that all of the application structure is resident in a single processor.

Figure 3:
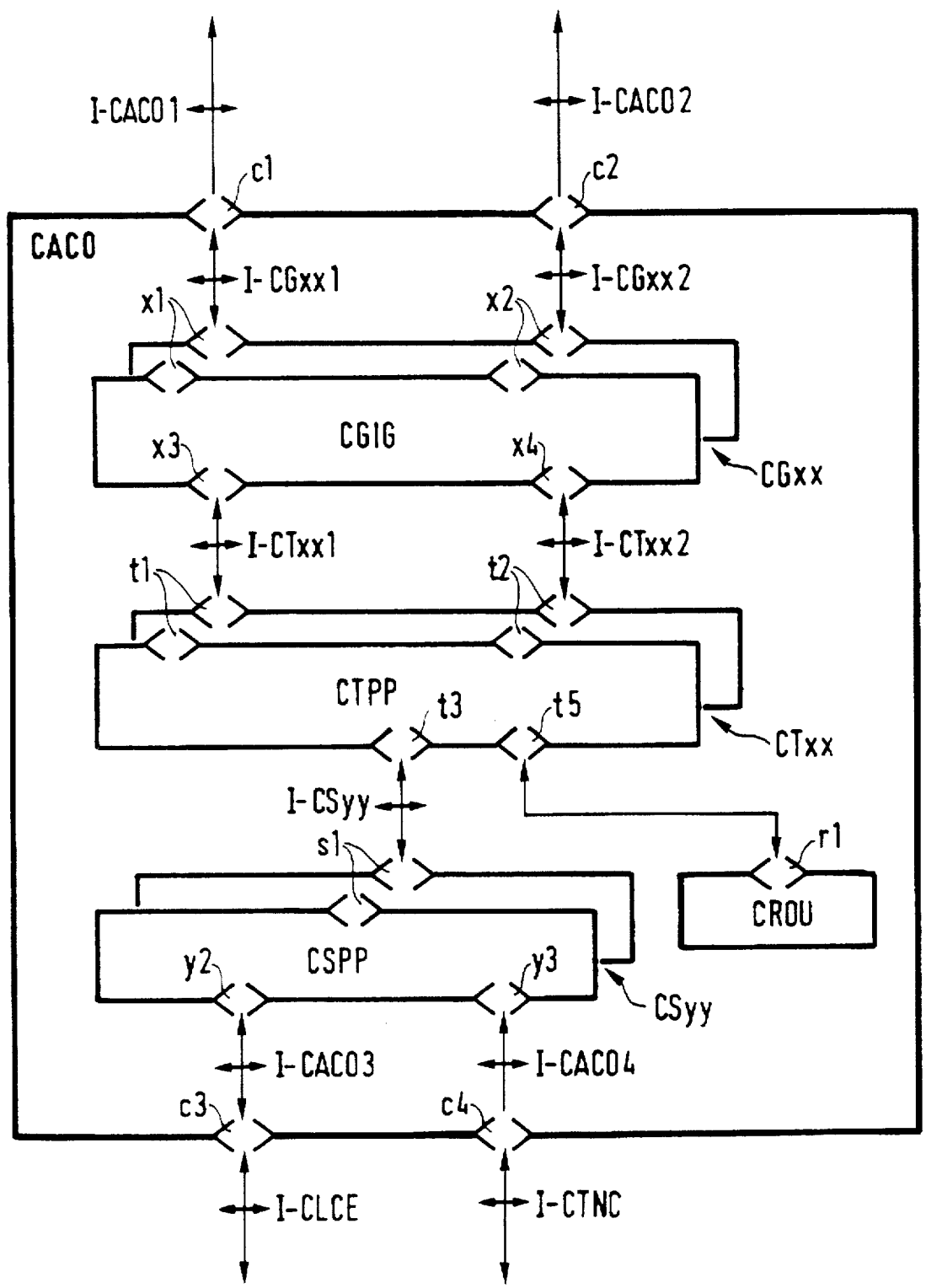
FIG. 3 shows the general structure of an object CACO designed in accordance with the present invention.

FIG. 3 shows the entire application structure which comprises two higher level interfaces I-CACO1 and I-CACO2, a global object CACO and two lower level interfaces I-CLCE and I-CTNC. The global object CACO is responsible for the call control function in a switching system. Generally speaking, a call request or a similar request emanates from a switching system user and call control consists in employing switching means and other means to respond to the call request. The higher level interface I-CACO1 is the interface with the communication function on the calling line side. The higher level interface I-CACO2 is the interface with the communication function on the called line side. The interface I-CTNC provides access to the switchpath search function to determine a switchpath for connecting the calling line to the called line. The interface I-CLCE provides access to the local switching equipment responsible for establishing the physical connection between the calling line and the called line using the previously determined switchpath.

The object CACO has SAP as described with reference to FIG. 1. From this point onwards the SAP will be simply represented by a small lozenge marked with the SAP reference. The object CACO receives a message from the interface I-CACO1 via the SAP c1. It forwards it to the SAP x1 of one of several included objects CGxx via the interface I-CGxx1. The same arrangement applies to the interfaces I-CACO2, I-CLCE, I-CTNC, the SAP c2, c3, c4 of the object CACO and the internal SAP x2, y2 and y3, the last two in relation to another of several included objects CSyy, via interfaces I-CACO3 and I-CACO4.

Figure 4:
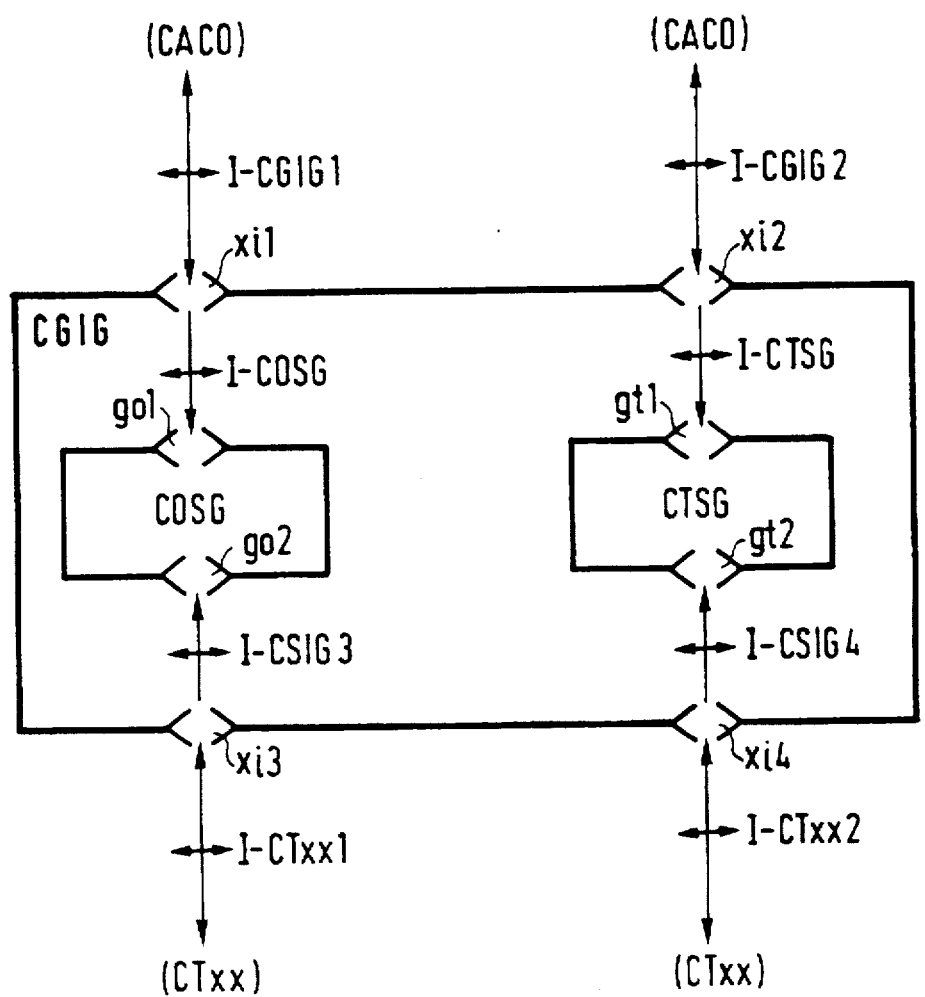
FIG. 4 shows the general structure of an object CSIG included in the object CACO from FIG. 2.

In the figure, the object CACO therefore includes at the top a series of similar objects as suggested by the drawing of a second object in perspective relative to the first, carrying the collective reference CGxx and which the object CACO accesses via respective interfaces I-CGxx1 and I-CGxx2 and respective SAP x1 and x2. These objects each process one subscriber communication protocol. FIG. 4 shows one of these (CGIG) in more detail. This is therefore one form of the object CGxx provided with SAP xi1 and xi2 accessible from the object CACO via the respective interfaces I-CGIG1 and ICGIG2. As the figure shows, the object CGIG is made up of two internal objects, namely a calling subscriber side communication object COSG and a called subscriber side communication object CTSG. These internal objects each have a respective SAP go1 and gt1 coupled to a counterpart of the SAP xi1 and xi2 of the object CGIG, via which they receive subscriber side communication messages via respective interfaces I-COSG and I-CTSG providing communication with the object CSIG, and a respective second SAP go2 and gt2 coupled to a counterpart of the SAP xi3 and xi4 of the object CGIG, at the lower level, for access to other objects also included in the main object CACO.

Figure 5:
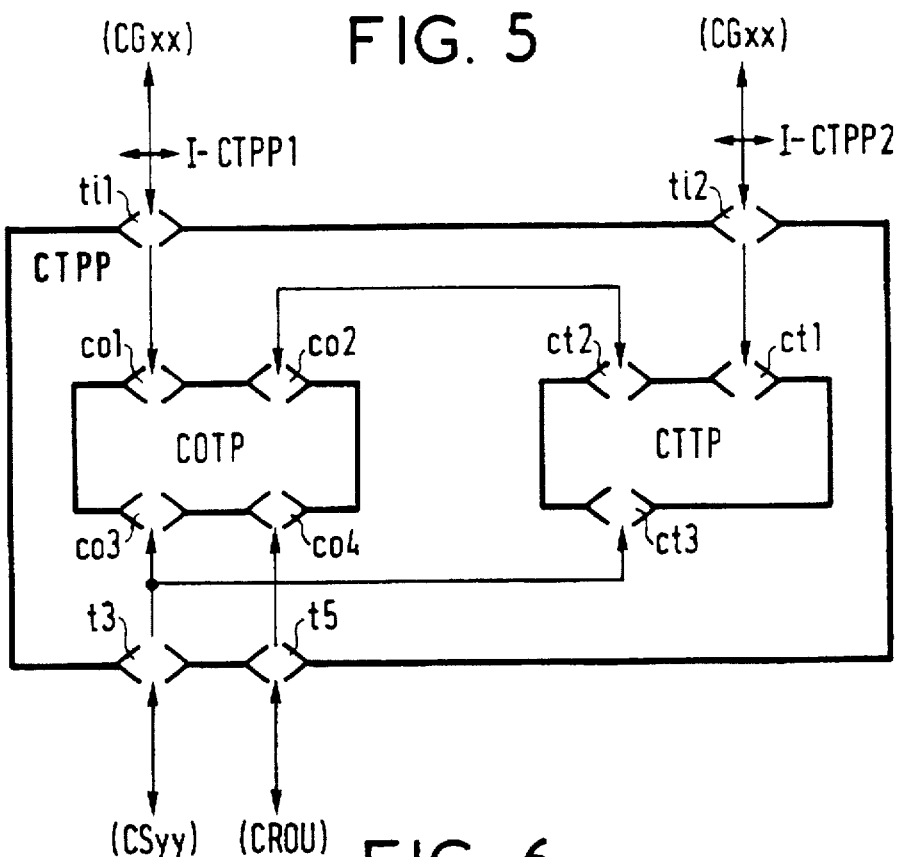
FIG. 5 shows the general structure of an object CTPP included in the object CACO from FIG. 2.

The object CACO also contains a series of telecommunication service provider objects with the collective name CTxx represented in the same way as the object CGxx and which the objects CGxx access via respective interfaces I-CTxx1 and CTxx2 and respective SAP t1 and t2. These objects each process functions relating to the supply of a specific telecommunication service. One of them (CTPP) identified in FIG. 3 is represented in FIG. 5. It provides the point-to-point telecommunication service. This object has SAP ti1 and ti2 accessible from the objects CGxx via respective interfaces I-CTPP1 and I-CTPP2. As the figure shows, the object CTPP is made up of two internal objects, namely a calling subscriber side communication object COTP and a called subscriber side communication object CTPP. These internal objects each have a respective SAP co1 and ct1 coupled to a counterpart of the SAP ti1 and ti2 of the object CTPP via which the object receives subscriber side communication messages from the object CGxx, and a respective second SAP co3 and ct3 coupled to the SAP t3 of the object CTPP at the lower level to access other objects with the collective name cyy. Also, a SAP co2 of the object COTP is connected direct to a SAP ct2 of the object CTPP to enable direct exchange of messages between the two included objects. Finally, the object COTP has an additional SAP co4 coupled via the SAP t5 of the object CTPP to an additional object CROU shown in FIG. 3 used to define a switchpath from the calling subscriber to a communication device which exchanges signals with the calling subscriber (essentially to receive the called party number). To simplify the figure, the interfaces associated with the various SAP of the FIG. 4 device are omitted.

Figure 6:
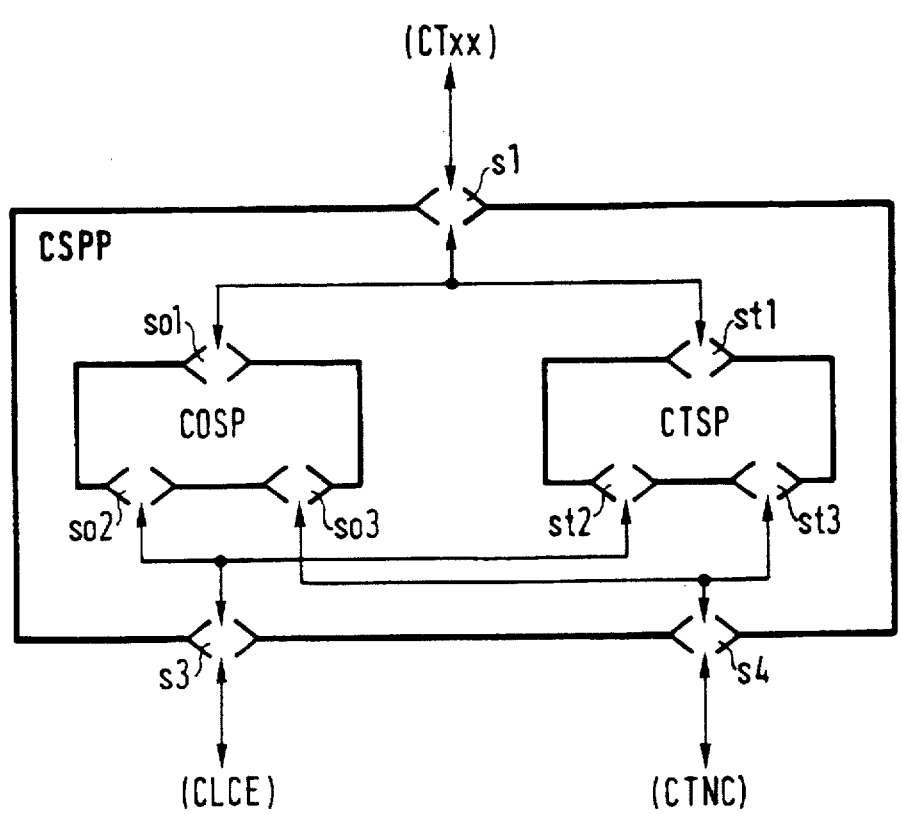
FIG. 6 shows the general structure of an object CSPP included in the object CACO from FIG. 2.

The object CACO further contains a series of service component objects with the collective name CSyy represented in the same way as the object CGxx and which the objects CTxx access via an interface I-CSyy and a SAP s1. These objects each process functions relating to a component of the service concerned, such as speech communication, video communication, etc. One of them (CSPP) identified in FIG. 3 is shown in FIG. 6. It supplies a service component such as speech communication and itself comprises two internal objects, namely a calling subscriber side communication object COSP and a called subscriber side communications object CTSP. These internal objects each have a respective SAP so1 and st1 coupled to the SAP s1 via which they receive subscriber side communication messages through a common interface (not shown) enabling communication with an object CTxx, a respective second SAP so2 and st2 coupled to the SAP s3 of the objects CSPP at the lower level and a respective third SAP so3 and st3 coupled to the SAP s4 of the object CSPP to access other objects via the interfaces I-CLCE and I-CTNC as explained above.

Finally, the object CACO contains at least the additional object CROU previously mentioned which the objects CTxx respectively access via their SAP t5. The object CROU has only one SAP r1 and must be seen as an auxiliary of the objects CTxx which the latter invoke to accomplish a function common to them, in a question-response mode, the single SAP receiving a question from an object and sending to that object the response from the CROU object.

The foregoing description is one example of implementation of a software structure in accordance with the invention in a particular application. To illustrate its use there follows a brief description of the kinds of messages exchanged and functions executed in this structure when setting up a speech communication between two subscribers. This description is given with reference to FIGS. 3 through 6.

A call request from a calling subscriber reaches the object CACO in the form of a message supplied via the interface I-CACO1 to the SAP c1. This is a call set-up request message emanating from a calling subscriber and is immediately forwarded to the object CGIG and, within the latter, to the object COSG.

The object COSG responds by sending to its SAP go2 a message called CTPP.t1—EST.RQ by virtue of the content of its header which is as previously described. This message is therefore addressed to the SAP ti1 of the object CTPP. Call set-up (EST) is requested (RQ). The accompanying parameters identify the subscriber and his characteristics, in particular the fact that he is communicating using speech signals.

Because this message is addressed to the SAP ti1, the message is retransmitted to the included object COTP, to its SAP to1. The latter in turn sends a message from its SAP co4 to the SAP t5 of the object CTPP, addressed to the object CROU mentioned above. This message is called CROU—

DET.RQ. It is sent to the object CROU which has only one SAP. A switchpath (DET) is therefore requested (RQ), being defined by the parameters mentioned above.

The object CROU responds with a return message CROU—DET.CF which repeats the essential elements of the request message header (CROU—DET) which enables it to be forwarded towards the user object with a new type of request (CF, indicating a response to a request) and supplies the required path in the message parameters.

The object COTP then sends a new message CSPP.s1— OREST.RQ to its SAP co3. This message is intended for the SAP s1 of the object CSPP and requests (RQ) a calling subscriber side connection (OREST), supplying the path already obtained. When the connection is set up, the object CSPP responds with a return message CSPP—OREST.CF.

The description of this process will end here, although it could be much more detailed, involving other objects; this is because the explanation given already is sufficient to show that the software structure of the application described, apart from the fact that it is made up of objects each having one function used in the context of the call processing process, comprises communication channels between objects, in other words means for routing messages between objects, according to their header and depending on the space occupied by each object in the application structure.

Consideration could be given to providing that in each application of the software each object knows the entire application structure, or at least the objects to which it may have to send messages. The originator object sends the message direct to the recipient object. More or less sophisticated variations on this concept are easy to conceive of. They all suffer from the requirements just mentioned: before designing any such object it is necessary to known the identities of the objects with which the first mentioned object is to communicate. It will be easily understood that although the identification of the functions which a given object must invoke is required, it is desirable to be able to defer the identification of the objects accomplishing these functions. It will be shown that this involves using relationships between objects as a means of routing messages to the objects accomplishing the functions that the messages request.

The object-oriented software structure caters for the previous existence of structuring relationships, as explained at the start of this description. According to the invention, the relationships possible between the objects of the software structure are:

the "use" relationship which specifies that an object is used by another object, the "dependency" or "hierarchy" relationship which specifies that one object is a particular form of a model object (at a higher level in the hierarchy), the "inclusion" relationship which specifies that an object is included in another object, the "homology" relationship which specifies that an object is homologous to another, enabling an object to be divided into two separately identified homologous parts.

These relationships are easily pin-pointed in the structure described with reference to FIGS. 3 through 6. The object CROU is used by the object CTxx. The object CTPP is dependent on the object CTxx. The objects COTP and CTPP are included in the object CTPP. They are homologous to each other.

Provision is made for routing messages having a header as described above using message routing means constituting a communication service allowing for such relationships in each application so that the object sending a message does not need to know the identity of the object that will carry out the operation requested by the message, which amounts to enabling it to name the function of a hypothetical object of which the operation is requested, the communication service being responsible for identifying the recipient structural object to which the message must eventually be delivered.

This communication service constitutes an object. This object uses another object to transfer the message to its recipient when the latter has been identified. These objects will now be described with reference to FIG. 7 which shows one embodiment of a message communication service in a structure in accordance with the invention.

Figure 7:
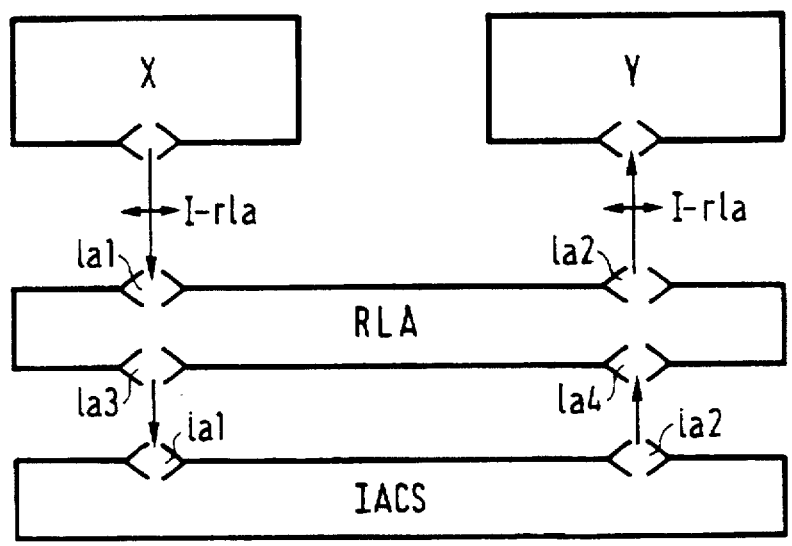
FIG. 7 shows one embodiment of message routing means which can be used in a structure in accordance with the invention.

In the FIG. 7 example objects X, Y (or rather the SAP X, Y of respective objects that are not shown, but this amounts to the same thing) communicate with each other by means of message transfer objects RLA and IACS. The message to be sent, which comes from the originator object X, for example, is included in the <parameters> field of a communication message addressed by the object X to the SAP la1 of the object RLA. The object FLA responds by setting up a link between the originator object and the object Y to which the message to send must be forwarded, in other words a structural object which is the effective recipient of the message, and delivers the message to be sent to this recipient object via its SAP la2. In setting up this link the object RLA takes into account the structure of the software, in other words the relationships between objects, to determine the identity of the recipient structural object from the message header and in particular from the <object> and <SAP> fields by applying relationships which apply to the object named in the <object> field. The object RLA translates the message header accordingly and has the object IACS route the message physically to the recipient object.

The relationships themselves are written in the data module of the object RLA in the form of enunciations of the type:

<OBJECTi> <SAPm> <D> <OBJECTj> <SAPn>, which means that the object denoted by <OBJECTi> is dependent on (this relationship is indicated by <D>) the object denoted <OBJECTj> and more precisely that the header of a message containing <OBJECTi> <SAPm> must be translated into a header containing <OBJECTj> <SAPn>, after which it remains only to route the message according to the new header, which IACS asks for, or <OBJECTi> <SAPm> <U> <OBJECTj> <SAPn>, or <OBJECTi> <SAPm> <I> <OBJECTj> <SAPn>, or <OBJECTi> <SAPm> <H> <OBJECTj> <SAPn>, in which expressions <U>, <I>, <H> respectively represents the "use", "inclusion" and "homology" relationships.

The inclusion of the identity of a SAP in the above relationships is optional.

In the FIG. 7 embodiment, on receiving a message from any object at its SAP la1, the object RLA looks up the relationships stored in its data module and modifies the header of the message according to these relationships. It then forwards the message to the SAP ia1 of the object IACS via its SAP la3. The object IACS routes the messages via transmission channels and at the point of arrival via its SAP ia2 it forwards it to the SAP la4 of the object RLA which via its SAP la2 supplies it to the recipient object whose identity is indicated in the message header.

In particular, the units sending and receiving messages may be installed in physically separate data processing devices. The object RLA exists in each of these devices, with a complete data module, in order to be able to execute its function to the benefit of objects installed in the device. Likewise, the object IACS exists in each of these devices and its various parts are interconnected to enable the routing of messages between then according to their header.

Figure 8:
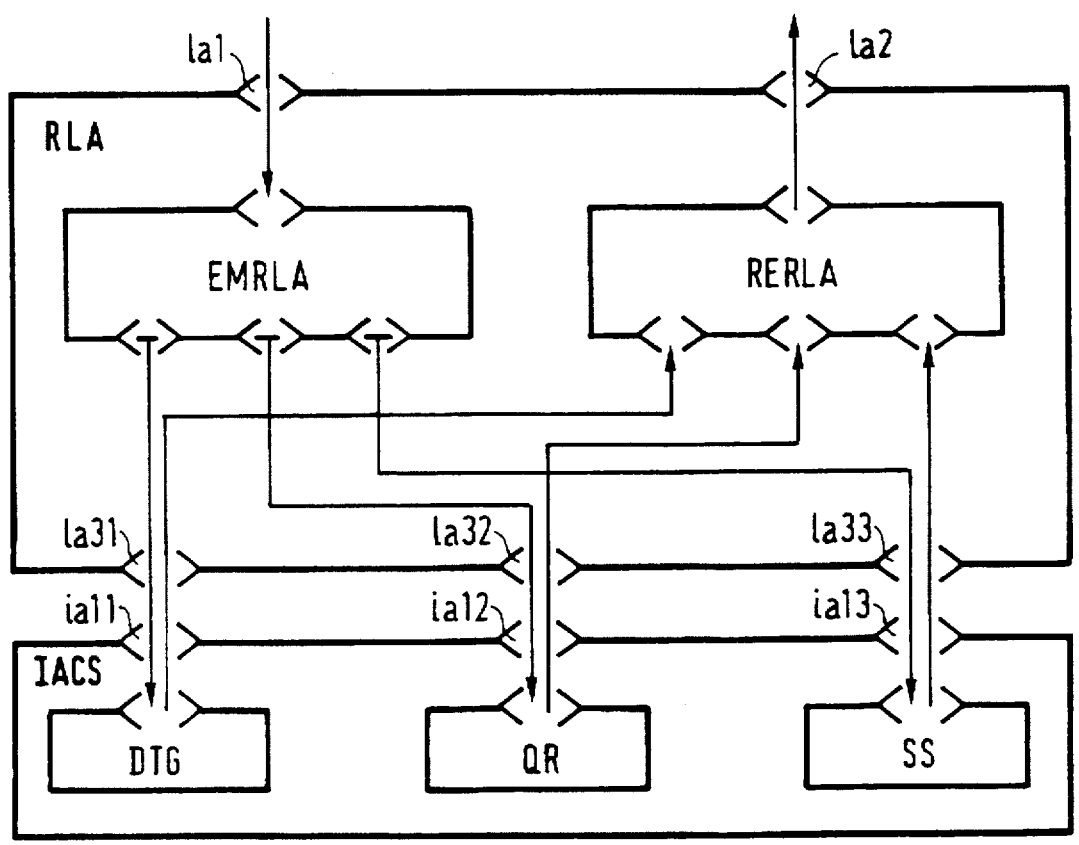
FIG. 8 shows an alternative embodiment of the message routing means from FIG. 7.

Reference will now be made to FIG. 8 which shows a more sophisticated version of the objects RLA and IACS from FIG. 7 in which the object RLA comprises two included objects, namely the send object EMRLA responsible for send side relationships of message routing and the receive object RERLA responsible for receive side relationships of message routing and the object IACS contains three included objects providing three message routing modes, the datagram sending object DTG, the question-response sending object QR and the session sending object SS.

The SAP la3 and la4 are replaced by what is shown as three two-way SAP la31, la32 and la33 but in actual fact represents three pairs of SAP for accessing the three included objects of the object IACS.

The datagram sending object DTG receives a message from the object EMRLA included in the object RLA, acknowledges receipt, sends it to the object RERLA included in the object RLA, receives an acknowledgement and supplies a "message forwarded" indication to the object EMRLA. Thus a datagram is a message comprising no response.

The question-response transmission object QR provides a transmission mode similar to the previous one but additionally provides for transmission in the reverse direction of a message in response to the first message routed which is regarded as a question.

Unlike the previous two objects, which are directed to routing only one message, the session sending object SS is adapted to send several messages between two defined objects in both directions. Session opening is requested by a first message from the originator object; it is accepted by the recipient object. The messages are then routed without requiring any response. Forwarding of the message is merely reported.

There will be no further description of transmission modes since a large number of these can be conceived of depending on communication requirements.

Finally, the foregoing description has merely mentioned the multiprocessing aspects which are outside the scope of the invention.

However, it will be remembered that each object (and this applies also to the objects RLA and IACS) comprises in its operating data "contexts" which are sets of data relating to call processing. The object may be called to accomplish one stage in the processing of a call, previously suspended, while waiting for an event to occur (the called subscriber to answer for example, or confirmation of call set-up or the response from another object having had to accomplish its own part in call processing. This event is reported to it by a message. This message is conventionally accompanied by information which in one way or another identifies the call concerned and therefore the "context" to which the object must refer and which describes the situation reached before processing was suspended in the object in question. The processing stage is accomplished relative to this context which is thus modified before the object abandons the call processing in question, at the end of the processing stage, so becoming available to process another call, with reference to another context.

The object RLA providing the message communication service is made responsible for the multiprocessing aspects, in other words assigning a context to a call process in an object invoked for the first time in respect of that call and identifying the contexts to be used each time that the object is invoked again for the same call, which can be based on the identity of the context of the originator object, also known to the object RLA, and so on.

It is evident that the foregoing description has been given by way of non-limiting example only and that numerous variants may be conceived of without departing from the scope of the invention.

There is claimed:

1. A method for structuring software in a telecommunication system, comprising creating a plurality of structural objects each incorporating data and software responsive to the data and each having a predetermined structural identity, providing each said structural object with a respective interface and at least one service access point module adapted to receive in accordance with an incoming communication protocol, an incoming message having an incoming header and parameters, said incoming header identifying said each structural object by its associated structural identity, and to transmit, in accordance with an outgoing communication protocol, an outgoing message having an outgoing header identifying another said structural object, providing each said structural object with one or more respective kernel modules adapted to perform respective operations whereby one or more of said outgoing messages are generated in response to one or more of said incoming messages, defining functional relationships which functionally relate at least some of said structural objects to other said structural objects, said functional relationships including dependency, use, inclusion and homology, providing a communication service structural object for relaying a message from an originating structural object identified in the outgoing header by its structural identity to an already existing recipient structural object identified only functionally but not structurally in said outgoing header, said communication service structural object being separate and distinct from the originating structural object and from the recipient structural object and including functional relationship data defining said functional relationships between said originating and recipient structural objects and means responsive both to the functional relationship data and to the functional identity in the outgoing header for determining the structural identity of said recipient structural object.

2. The software structuring method of claim 1 wherein said recipient structural object has a plurality of said service access points, said outgoing header does not designate a particular said service access point, said incoming header designates said particular said service access point, and said communication service identifies both said recipient structural object and said particular service access point.

3. The software structuring method of claim 2 wherein said outgoing header identifies a particular said operation to be performed by the recipient structural object and said communication service identifies said particular service access point based at least in part on said particular operation.

4. The software structuring method of claim 1 wherein said outgoing communication protocol is associated with the service access point module of the recipient structural object and is identified to the notified by the recipient structural object the latter to the service access point module of the originator object so that the latter uses it.

5. The software structuring method of claim 1 wherein said communication service assigns a respective context to each call when said recipient structural object is invoked for the first time in relation to said call and identifies said respective context each time that said recipient object is again invoked for said call.

* * * * *